United States Patent Office 3,547,545
Patented Dec. 15, 1970

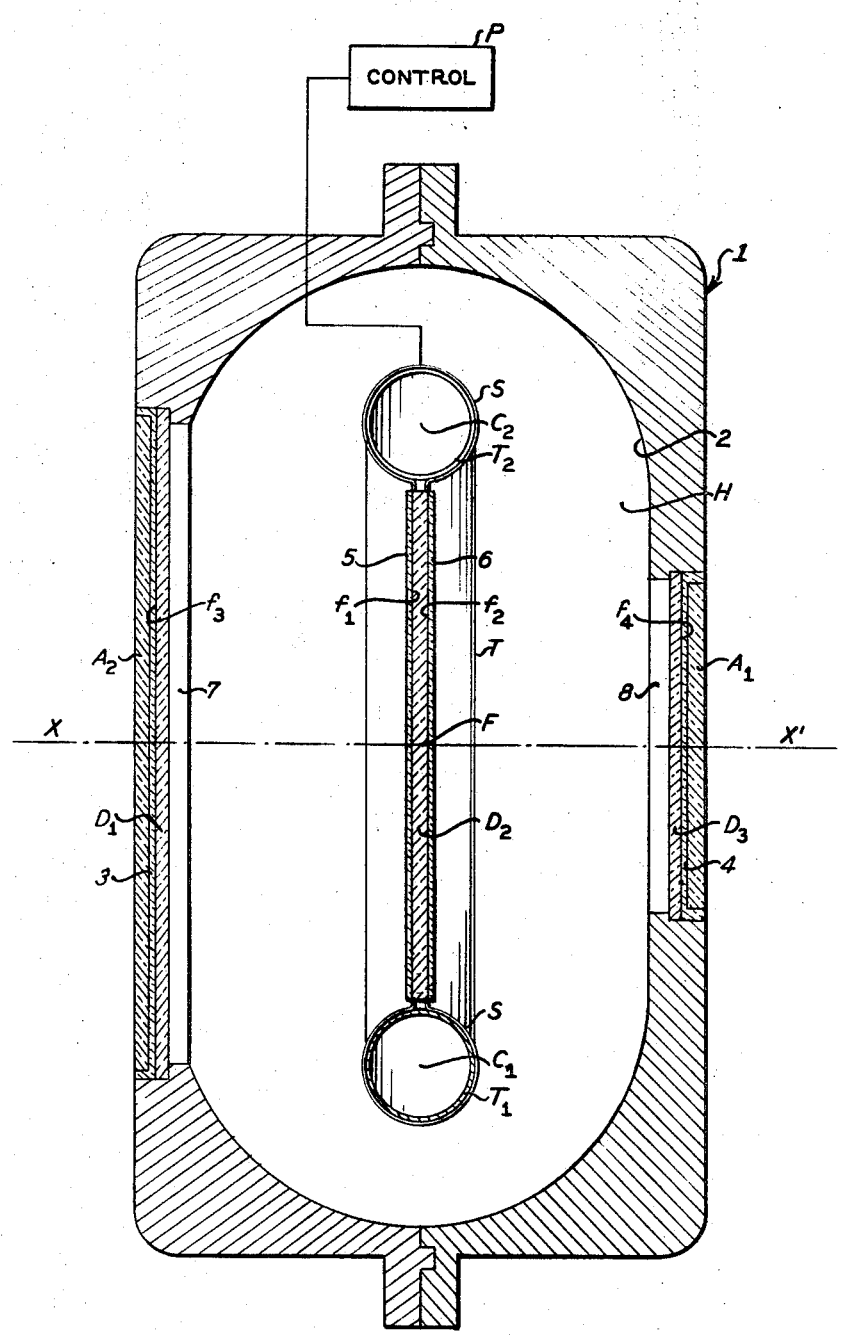

3,547,545
ANTIGLARE SYSTEM AND METHOD
Constant Wippler, Epinay-sur-Orge, France, assignor to Compagnie de Saint-Gobain, Neuilly-sur-Seine, Hauts-de-Seine, France
Filed May 11, 1965, Ser. No. 455,670
Int. Cl. G02c 7/10; G02f 1/36
U.S. Cl. 350—160                                    5 Claims The present invention relates to antiglare systems and methods adapted to protect the eyes against glare from sources of intense light, such as the sun, a mercury vapor lamp, an electric arc, the flash of a nuclear explosion, or the like.

Devices and methods provided in accordance with the invention use the property of non-colored or slightly colored "photochrome" substances, which become strongly colored when they are subjected to intensive electromagnetic rays, such as ultraviolet rays, and which return to their initial state after the irradiation is terminated.

Said "photochrome" substances are used in the form of transparent filters, either by dissolution in liquids or by incorporation in a solid transparent film.

It is known that the coloration imparted to such "photochrome" filters is an increasing function of the lighting, thus, of the inverse of the square of the distance of the source of light. It results therefrom that, when said source is rather remote, the coloration taken on by the "photochrome" filter may be insufficient to protect the observer from the glare.

In order to overcome this disadvantage, particularly when the source is of an ephemeral nature such as, for example, the flash of an atomic bomb, it has been proposed to bring about the coloration of the "photochrome" layer artificially with the aid of an electronic flash tube which is triggered by an attached device in response to a photoelectric cell reacting to the change of lighting caused by the start of the phenomenon from which the observer is to be protected.

The present invention thus has among its objects the provision of improvements in antiglare devices comprising a "photochrome" layer, the coloration of which is triggered by electronic flash, with a view to utilizing, as efficiently as possible, the ultraviolet radiation emanating from the electronic flash.

In brief, and antiglare system according to the invention comprises, for example, three transparent, substantially equidistant discs provided with "photochrome" layers or shield means and centered on the optical axis of the apparatus perpendicularly to said axis, the central disc being surrounded by a toroidal electronic flash tube, the system being enclosed and kept in a case having a reflecting inner surface and being provided with openings opposite the two outer discs comprising the "photochrome" layer.

An embodiment of such a device will be more specifically described in detail below with reference to the accompanying drawing in which the sole figure shows a longitudinal section through a plane passing through the optical axis.

In the drawing, the optical axis X–X' may be considered as an axis of symmetry of a surface of revolution of the entire system, with the exception of the electrodes of the electronic flash tube which are not shown in the drawing, the section being supposedly effected in a plane perpendicular to said electrodes.

It will be seen that three transparent discs $D_1$, $D_2$ and $D_3$ are centered on the optical axis, the central disc $D_2$ being surrounded by a coaxial and coplanar torus formed by the electronic tube T, the profiles $T_1$ and $T_2$ of said torus in the plane of the section being visible in the drawing. The disc $D_2$ is held by a filiform support S resting on and supported by the torus of the electronic tube. The case 1, having an internal chamber H wherein the device is mounted, comprises a reflecting inner surface 2, whose section, through the plane of the drawing is composed of two almost eliptical portions having a common focus F which is also the center of the disc $D_2$, and two other focuses coinciding with the centers $C_1$ and $C_2$ of the circular sections of the torus. Surface 2 has a cross-section in the form of a surface of revolution generated by an ellipse having a major axis perpendicular to the axis X–X'. All light rays emitted by the flash tube strike (either directly or after being reflected by the reflecting inner surface 2 of the case) the discs $D_1$, $D_2$ and $D_3$ which are coated with "photochrome" layers.

In the embodiment shown in the drawing, the central disc $D_2$ carries the "photochrome" layers 5 and 6 respectively on each of its two faces $f_1$ and $f_2$. As regards outer discs $D_1$ and $D_3$, mounted in ports 7 and 8, they carry only a single "photochrome" layer 3 or 4 respectively, said layers being located on the outer surfaces or faces $f_3$ and $f_4$ of the discs, i.e., on the side not directly exposed to electronic flash. This arrangement will preferably be selected when the flash tube used generates high energy or is located at a small distance from the discs $D_1$ and $D_2$. In certain cases, more particularly when the flash tube is supplied with medium energy or if it is located at an appreciable distance from the discs $D_1$ and $D_2$, it is preferable to place the "photochrome" layers on the inner surface of the discs.

The advantageous effect of interposing the disc between the "photochrome" layer and the electronic flash, in the case of high energy, is explained by the fact that the heat radiations, which are harmful to the coloration of the "photochrome," are thus largely absorbed by the disc.

It is to be noted that the dimensions of the surfaces of the discs are selected in such a manner that the field of vision is approximately the same across each of said discs. Further, and by way of example, the electronic tube may be a torus having an inside diameter of 32 mm. and an outside diameter of 40 mm.; the diameter of the disc $D_2$ may be about 30 mm.; the diameter of disc $D_1$ is about 40 mm., and the diameter of disc $D_3$ about 20 mm. The planes of the discs $D_1$ and $D_2$ may be separated from the main plane of the torus by a distance of the order of 15 mm.

In order to eliminate the visible light coming from the electronic flash and received by reflection on the eye, a screen may be provided which allows the active ultraviolet radiation to pass, but which stops the visible light between the flash tube and the "photochrome" surfaces, but it is preferable to make the flash tube of a glass which allows only the active ultraviolet to pass therethrough.

The residual ultraviolet can be stopped by selecting for the disc $D_3$ a substance opaque to said radiation when the "photochrome" layer is placed on the inner surface of the disc $D_3$. In the opposite case, an additional screen or disc $A_1$ is provided which stops the ultraviolet rays beyond the "photochrome" layer 4.

When the "photochrome" layer is deposited on the inner surface of $D_1$, it may also be of interest to render disc $D_1$ opaque to the ultraviolet if slow degardation of the "photochrome" substance by ambient ultraviolet radiation is to be avoided. In the opposite case, i.e. if the "photochrome" layer 3 is placed on the outer face of disc $D_1$, as shown in the drawing, an additional screen or disc $A_2$ is provided to stop the ultraviolet rays in front of disc $D_1$.

The nature of the "photochrome" substances may vary from one surface to the next. In particular, the substances may be selected so that they absorb in the entire visible spectrum. On the other hand, if a given region of the visible spectrum is not absorbed, a supplemental filter with fixed optical density may be introduced which will compensate the absorption defect of the "photochrome" substancs in said region. This filter may, more particularly, be formed by the disc $D_1$ or the disc $D_3$ itself.

The device P with a photo-electric cell adapted to trigger the electronic flash is shown only diagrammatically. Such photo-electrically controlled switch devices are known per se and may, for example, include a photo-electric cell mounted in an optical system such that it reacts to a change of the lighting of the image of the source rather than to a change of the lighting of the surface of the optical system exposed to said source, for, in the first case, the change in lighting is independent of the distance of the source whereas, in the second case, it is inversely proportional to the square of said distance.

With the exception of the triggering system, the antiglare system according to the invention may be of small overall size and of little weight, it may be made in the form of eyeglasses which can be worn without tiring the wearer.

As to photochrome substances, which are not per se the subject of this invention, these may be exemplified by way of example by a varnish employed on a base of trimethyl-1,3,3-indoline-2-spiro-2'-nitro-6'-benzo-(b) - pyran which with an electronic flash tube supplied with an energy of 200 joules (watt-seconds) provides an optical density obtained of the order of 4 whereas the optical density can be raised to 8 by supplying the electronic flash with an energy of 400 joules.

What is claimed is:

1. An antiglare system comprising, in sequence, first, second and third discs defining a common optical axis and including photochrome surface layers having optical densities responsive to electromagnetic radiations, said discs each having two faces, said first and third discs being the outer of the discs and said second disc being the central of the discs and including photochrome surface layers on both faces thereof whereas said first and third discs include photochrome surfaces on only one of the respective faces thereof, a case provided with an internal chamber within which said second disc is accommodated and with ports opening into said chamber and in which said first and third discs are accommodated and supported, said case having an internal reflective surface bounding said chamber, a toroidal radiation means encircling and coaxial with said central disc, and means coupled to said radiation means to operate the latter to excite said photochrome layers.

2. An antiglare system comprising, in sequence, first, second and third equally spaced discs defining a common optical axis and including photochrome surface layers having optical properties responsive to electromagnetic radiations, said discs each having two faces, said first and third discs being the outer of the discs and said second disc being the central of the discs and including photochrome surface layers on both faces thereof whereas said first and third discs include photochrome surfaces on only the outer faces thereof, a case provided with an internal chamber within which said second disc is accommodated and with ports opening into said chamber and in which said first and third discs are accommodated and supported, said case having an internal reflective surface bounding said chamber, a torodial electronic flash tube encircling and coaxial with said central disc, said tube including an outer element permeable only to ultraviolet radiation, and means externally of said case and coupled to said tube to operate the latter to excite said photochrome layers.

3. An antiglare system comprising, in sequence, first, second and third equally spaced transparent discs defining a common optical axis and including photochrome surface layers having optical properties responsive to electromagnetic radiations, said discs each having two faces, said first and third discs being the outer of the discs and said second disc being the central of the disc and including photochrome surface layers on both faces thereof whereas said first and third discs include photochrome surfaces on only the outer faces thereof, a case provided with an internal chamber within which said second disc is accommodated and with ports opening into said chamber and in which said first and third discs are accommodated and supported, said case having an internal reflective surface bounding said chamber and of a cross-section in the form of a surface of revolution generated by an ellipse having a major axis perpendicular to said optical axis, a toroidal electronic flash tube encircling and coaxial with said central disc and being supported on the latter in coplanar relationship therewith, said tube having a circular cross-section, said reflective surface having focuses at the optical axis defined by said discs and at the centers of the cross-section of said tube, said tube including an outer element permeable only to ultraviolet radiation, and ultraviolet screens on the outside of said first and third discs to prevent ultraviolet radiations from passing out of said case.

4. An antiglare system comprising, in sequence, first, second and third discs defining a common optical axis and including photochrome surface layers having optical properties responsive to electromagnetic radiations, said discs each having two faces and having dimensions such that the field of vision is at least substantially the same across each of the respective discs, said first and third discs being the outer of the discs and said second disc being the central of the discs and including photochrome surface layers on both faces thereof whereas said first and third discs include photochrome surfaces on only the outer faces thereof, a case provided with an internal chamber within which said second disc is accommodated and with ports opening into said chamber and in which said first and third discs are accommodated and supported, said case having an internal reflective surface bounding said chamber and of a cross-section in the form of a surface of revolution generated by an ellipse having a major axis perpendicular to said optical axis, and a toroidal electronic flash tube encircling and coaxial with said central disc and being supported on the latter in coplanar relationship therewith, said tube having a circular cross-section, said reflective surface having focuses at the optical axis defined by said discs and at the centers of the cross-section of said tube, said tube including an outer element permeable only to ultraviolet radiation.

5. An antiglare system comprising, in sequence, first, second and third equally spaced transparaent discs defining a common optical axis and including photochrome surface layers having optical properties responsive to electromagnetic radiations, said discs each having two faces and having dimensions such that the field of vision is at least substantially the same across each of the respective discs, said first and third discs being the outer of the discs and said second disc being the central of the discs and including photochrome surface layers on both faces thereof whereas said first and third discs include photochrome surfaces on only the outer faces thereof, a case provided with an internal chamber within which said second disc is accommodated and with ports opening into said chamber and in which said first and third discs are accommodated and supported, said case having an internal reflective surface bounding said chamber and of a cross-section in the form of a surface of revolution generated by an ellipse having a major axis perpendicular to said optical axis, a toroidal electronic flash tube encircling and coaxial with said central disc and being supported on the latter in coplanar relationship therewith, said tube having a circular cross-section, said reflective surface having focuses at the optical axis defined by said discs and at the centers of the cross-section of said tube, said tube including an outer element permeable only to ultraviolet radiation, ultraviolet screens on the outside of said first and third discs to prevent ultraviolet radiations from passing out of said case, and photo-electrically controlled switch means externally of said case and coupled to said tube to operate the latter to excite said photochrome layers.

References Cited
UNITED STATES PATENTS
3,152,215  10/1964  Barstow et al.

VERLIN R. PENDEGRASS, Primary Examiner